United States Patent [19]
Ellis et al.

[11] Patent Number: 5,531,224
[45] Date of Patent: Jul. 2, 1996

[54] FRAMEM INTERPOLATOR FOR INCREASING APPARENT ACOUSTIC FRAME RATE IN ULTRASOUND IMAGING

[75] Inventors: Matthew Ellis, Waukesha; Rowland F. Saunders, Hartland; James A. Smith, Pewaukee, all of Wis.; Patrick Noret, Montigny, France

[73] Assignee: General Electric Company, Milwaukee, Wis.

[21] Appl. No.: 344,046

[22] Filed: Nov. 23, 1994

[51] Int. Cl.$^6$ ...................................................... A61B 8/00
[52] U.S. Cl. ................................ 128/660.07; 128/661.01; 73/626
[58] Field of Search .......................... 128/661.01, 661.02, 128/660.04, 660.07; 73/625, 626; 364/413.25

[56] References Cited

U.S. PATENT DOCUMENTS

| | | | |
|---|---|---|---|
| 5,197,037 | 3/1993 | Leavitt | 128/661.01 |
| 5,396,890 | 3/1995 | Weng | 364/413.25 |

*Primary Examiner*—George Manuel
*Attorney, Agent, or Firm*—Dennis M. Flaherty; John H. Pilarski

[57] ABSTRACT

A method and an apparatus for increasing the apparent acoustic frame rate of ultrasound images. Frames of acoustic data are acquired at the acoustic frame rate, stored in double-buffered acoustic frame buffers and scan converted one after the other. For each pair of successive frames, the first acoustic frame is stored in a frame delay buffer while the other acoustic frame is being scan converted. In accordance with this scheme, the scan converter is always reading from an acoustic frame buffer that contains a single complete frame of acoustic data, thereby eliminating the swirl artifact. To increase the apparent acoustic frame rate, the scan-converted acoustic data is input to a scan-converted frame interpolator, which incorporates the frame delay buffer, a frame interpolator programmable read only memory (PROM) and a software-programmable inter-polator bank select look-up table. The frame interpolator PROM incorporates a two-point FIR filter which outputs a frame of interpolated scan-converted acoustic data $X_n'$ in response to input of the scan-converted acoustic data $X_n$ and $X_{n-1}$. A predetermined number of unique frames of scan-converted acoustic data $X_n'$ can be generated from the acoustic data $X_n$ and $X_{n-1}$ of a given pair of frames by changing the weighting factors at the video rate while recycling the scan-converted acoustic data of the given pair of frames.

20 Claims, 4 Drawing Sheets

FRAMEM INTERPOLATOR FOR INCREASING APPARENT ACOUSTIC FRAME RATE IN ULTRASOUND IMAGING

FIELD OF THE INVENTION

This invention generally relates to ultrasound imaging of human tissue and blood. In particular, the invention relates to a method and an apparatus for increasing the apparent acoustic frame rate of ultrasound images.

BACKGROUND OF THE INVENTION

Measurement of blood flow in the heart and vessels using the Doppler effect is well known. Whereas the amplitude of the reflected waves is employed to produce black and white images of the tissues, the frequency shift of the reflected waves may be used to measure the velocity of reflecting scatterers from tissue or blood. Color flow images are produced by superimposing a color image of the velocity of moving material, such as blood, over the black and white anatomical image. The measured velocity of flow at each pixel determines its color. The process by which by which black and white images are formed is conventionally referred to as B-mode imaging, while the process by which flow velocity is imaged using colors is conventionally referred to as color flow imaging.

During B-mode only imaging, ultrasound machines fire a set of B-mode acoustic vectors to obtain real-time images of anatomy with the human body. Likewise color flow imaging requires the firing of a set of color flow vectors. This requires the ultrasound machine to fire both B-mode and color flow vectors. The addition of the color flow vectors to the B-mode firings decreases the acoustic frame rate significantly. This decreases the update rate of the image data to an unacceptable level, which detracts from the real-time nature of the image and is a distraction to the user.

FIG. 3 shows an approach used in a conventional ultrasound machine to increase the apparent frame rate of the color flow data. In this approach, the apparent acoustic frame rate is increased by performing a 2:1 interpolation of the incoming acoustic data. The input to the interpolator 50 is the acquired color acoustic data, which is input at the acoustic frame rate. The interpolator generates additional color acoustic data sets by interpolating between each pair of acquired acoustic data sets. The interpolator output, which is at two times the acquired acoustic frame rate, is stored in a single acoustic frame buffer 52. The acoustic data is then read by a scan converter 54. A scan converter converts the acoustic image data from polar coordinate (R-θ) sector format or Cartesian coordinate linear array to appropriately scaled Cartesian coordinate display pixel data at the video rate. This scan-converted acoustic data is then output for display on a video monitor 56. The method effectively doubles the apparent frame rate of the color flow data.

The limitations of this prior art approach are two-fold. First, the 2x interpolation does not sufficiently improve the apparent acoustic frame rate in many cases. The second limitation lies in the use of a single acoustic frame buffer for storing and outputting the acoustic data. Because acoustic data is continuously written into the acoustic frame buffer, at any given time the acoustic frame buffer will contain data from more than one acoustic frame. The scan conversion process, which reads acoustic data out of the acoustic frame buffer, will therefore create images for display that contain data from two or more different acoustic frames. This results in an artifact in the image in which there is a distinct boundary between old and new data in the image. Because the acoustic frame rate and the video rate are asynchronous to each other, the artifact will precess through the image based on the ratio of the acoustic frame rate and the video rate. This "swirl" artifact is particularly noticeable when there is movement in the anatomy being imaged or if there is movement of the ultrasound transducer. The swirl artifact precesses through the image as new acoustic frames are acquired, scan converted and displayed.

SUMMARY OF THE INVENTION

The present invention is a method and an apparatus for increasing the apparent acoustic frame rate of ultrasound images. This method both increases the maximum interpolation rate and eliminates the swirl artifact. The method has application in both color flow and B-mode imaging.

In accordance with the method of the invention, the acoustic data is acquired at the acoustic frame rate and stored in double-buffered acoustic frame buffers. After a complete acoustic frame has been written into the first buffer in a first cycle, the next acoustic frame is written into the second buffer during a second cycle. During the second cycle, while the second acoustic frame is being written into the second buffer, the scan converter reads the first acoustic frame from the first acoustic frame buffer. The scan-converted acoustic data $X_{n-1}$ of the first acoustic frame are stored in a frame delay buffer. During the next and third cycle, the first acoustic frame in the first acoustic frame buffer is overwritten by the acoustic data of a third acoustic frame and the scan converter switches to read the second acoustic frame from the second acoustic frame buffer and then output scan-converted acoustic data $X_n$ corresponding to the second acoustic frame. In accordance with this scheme, the scan converter is always reading from an acoustic frame buffer that contains a single complete frame of acoustic data, thereby eliminating the swirl artifact.

To increase the apparent acoustic frame rate, the scan-converted acoustic data is input to a scan-converted frame interpolator, which incorporates the frame delay buffer, a frame interpolator programmable read only memory (PROM) and a software-programmable interpolator bank select look-up table. During each cycle, the scan-converted acoustic data $X_n$ of the acoustic frame read from one of the acoustic frame buffers and the scan-converted acoustic data $X_{n-1}$ of the delayed acoustic frame stored in the frame delay buffer are simultaneously input to the frame interpolator PROM. The frame interpolator PROM incorporates a two-point FIR filter which outputs a frame of interpolated scan-converted acoustic data $X_n'$ in response to input of the scan-converted acoustic data $X_n$ and $X_{n-1}$. The interpousing scan-converted acoustic data $X_n'$ are generated a formula in which weighted versions of scan-converted acoustic data $X_n$ and $X_{n-1}$ are summed. The addition includes compensation for aliasing.

In accordance with the preferred embodiment of the invention, the frame interpolator PROM has a plurality of selectable banks of weighted data. Each bank contains pixel values equal to the sum of first and second weighted data. When input to the PROM, the address formed by the acoustic data $X_n$ and $X_{n-1}$, in conjunction with the bank select signal, retrieves a pixel value from the PROM which is the sum of a weighted version of the scan-converted acoustic data $X_n$ of the second acoustic frame and a weighted version of the scan-converted and delayed acoustic data $X_{n-1}$ of the first acoustic frame. The sum in each bank is a function of a unique pair of weights, the sum of the weights being unity.

In accordance with the invention, the banks are selectable via a software-programmable interpolator bank select look-up table. Each location in the interpolator bank select look-up table is programmed with a bank select value. The interpolator bank select look-up table is sequenced through at the video rate, allowing the frame interpolator PROM bank (and the unique pair of weights associated therewith) to be specified for each scan conversion. A predetermined number of the plurality of available banks can be selected in a given interpolator bank select look-up table sequence. This allows a predetermined number of unique frames of acoustic data $X_n'$ to be generated from the acoustic data $X_n$, and $X_{n-1}$ of a given pair of frames. The result is an increase in the apparent acoustic frame rate by a predetermined factor and a presentation of a smoother and less distracting ultrasound image (B-mode or color flow) to the ultrasound machine operator. The programmable nature of the interpolator bank select look-up table allows the frame interpolator PROM bank select sequence to be optimized to provide the smoothest ultrasound image appearance possible.

DETAILED DESCRIPTION OF THE PREFERRED EMBODIMENTS

Figure 1:
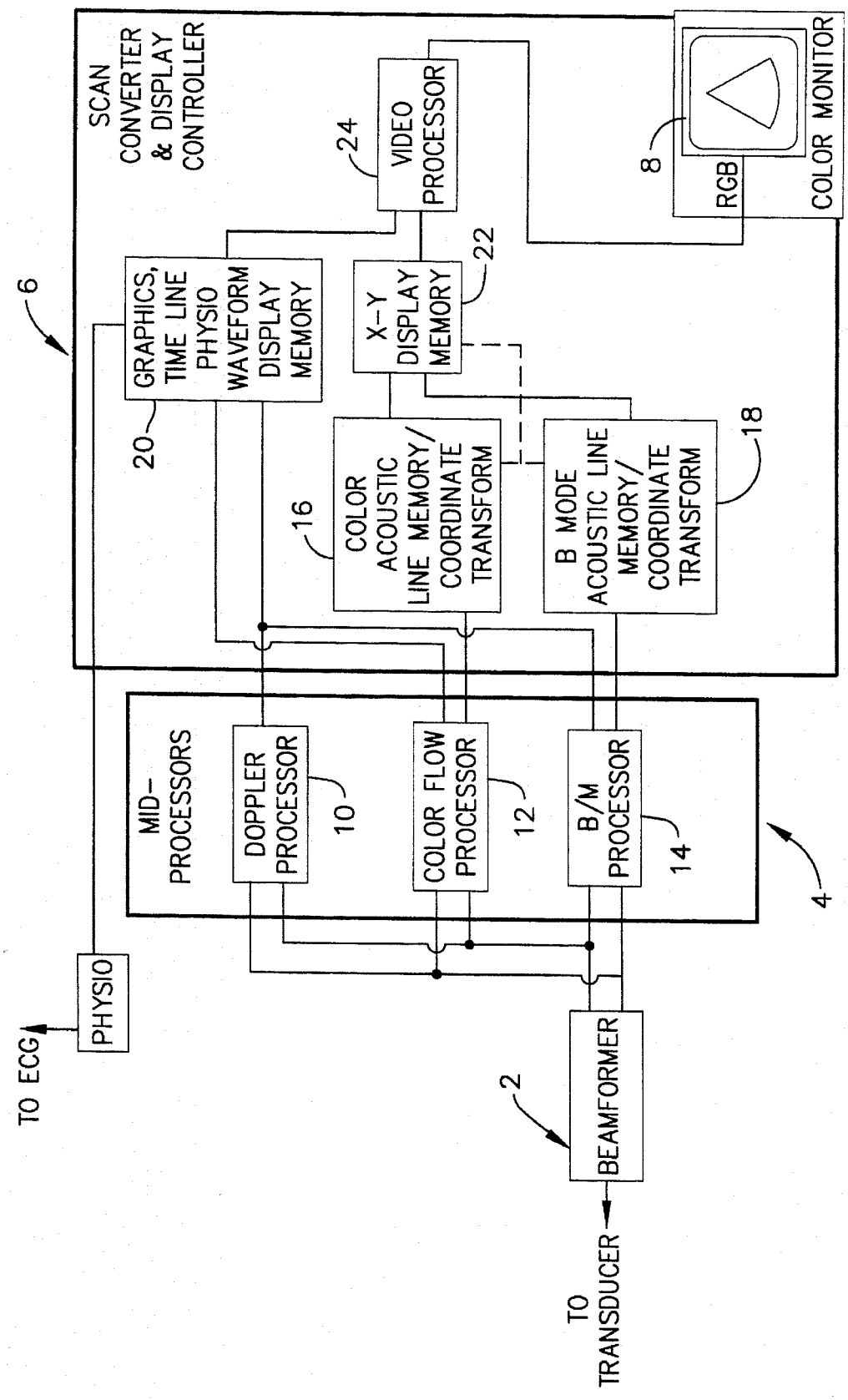
FIG. 1 is a block diagram showing the major functional blocks of a real-time ultrasound imaging system.
Figure 2A:
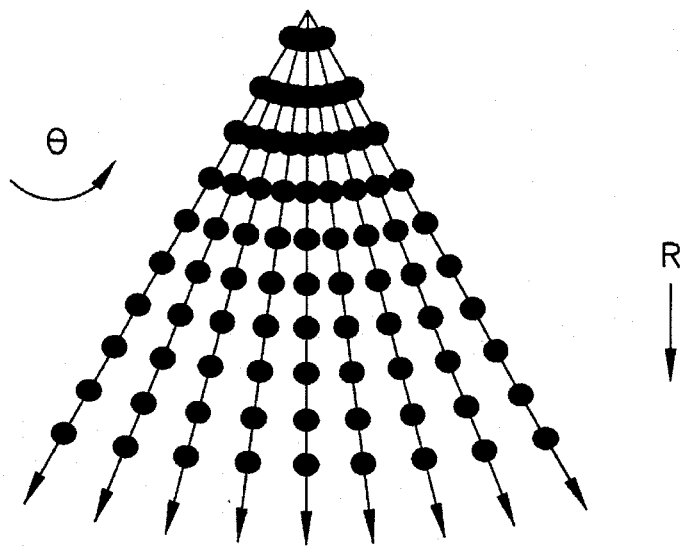
FIG. 2A is a diagram illustrating the format used in the acquisition and display of sector scan data by the beamformer of the system shown in FIG. 1.
Figure 2B:
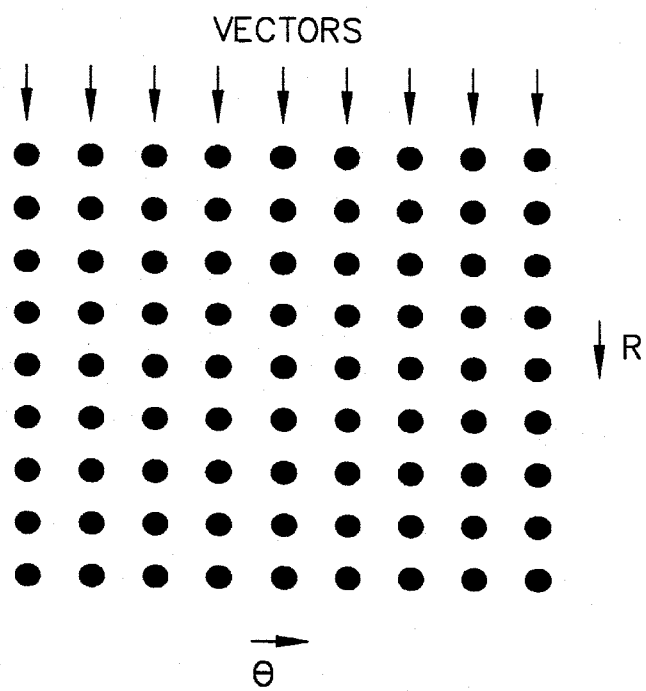
FIG. 2B is a diagram illustrating the conventional scan conversion process whereby the acoustic image data is converted from polar coordinate (R-θ) sector format to appropriately scaled Cartesian coordinate display pixel data.
Figure 3:
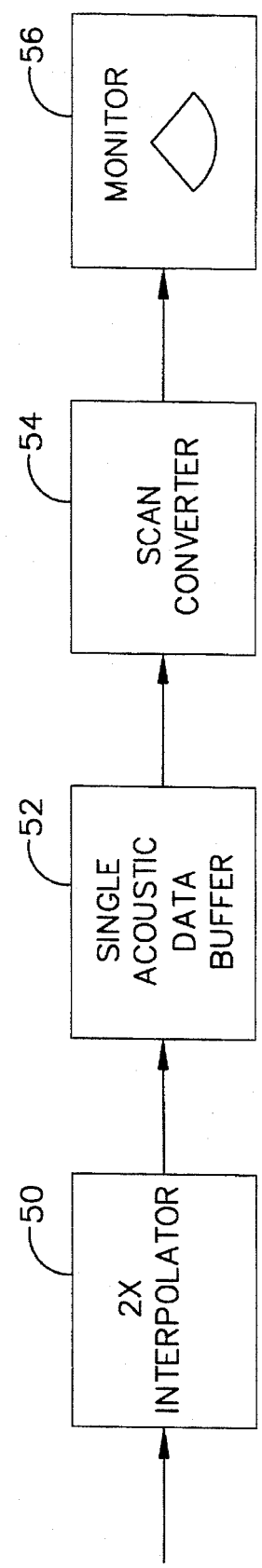
FIG. 3 is a block diagram showing a conventional color frame processing technique for increasing the apparent acoustic frame rate by interpolation.

The present invention is incorporated in an ultrasound imaging system consisting of four main subsystems: a beamformer 2 (see FIG. 1), midprocessors 4, a scan converter/display controller 6 and a kernel (not shown). System control is centered in the kernel, which accepts operator inputs through an operator interface and in turn controls the various subsystems. The kernel also generates the system timing and control signals which are distributed via a system control bus and a scan control bus (not shown).

The main data path begins with the analog RF inputs to the beamformer from the transducer. In accordance with conventional practice, the beamformer outputs two summed digital baseband I,Q receive beams. The I,Q bus 8 is input to the midprocessors, where it is processed according to the acquisition mode and output as processed vector (beam) acoustic data to the scan converter/display processor. The scan converter accepts the processed acoustic data and outputs the video display signals for the image to a color monitor 8.

The beamformer is responsible for the transmit and receive beamforming. It includes an interface to the transducers; time delay boards containing the analog receive channel, the transmitter and digital channel and beamforming; equalization and TGC control; a front end controller; and a system timing generator. The beamformer's signal inputs are the low-level analog RF signals from the transducer elements. The data output of the beamformer is two (right and left) complex (I, Q) digital baseband receive beams.

The B/M midprocessor 14 converts the baseband I and Q data from the beamformer equalization board into a log-compressed version of the signal envelope. The B function images the time-varying amplitude of the envelope of the signal as a grey scale. The envelope of a baseband signal is the magnitude of the vector which I and Q represent. The I,Q phase angle is not used in the B/M display. The magnitude of the signal is the square root of the sum of the squares of the orthogonal components (I and Q).

The frequency of sound waves reflecting from the inside of blood vessels, heart cavities, etc. is shifted in proportion to the velocity of the blood cells: positively shifted for cells moving towards the transducer and negatively for those moving away. The Doppler midprocessor 10 computes the power spectrum of these frequency shifts for visual display and it also synthesizes an audio signal from the separated positive and negative shifts.

The color flow midprocessor 12 is used to provide a real-time two-dimensional image of blood velocity in the imaging plane. The blood velocity is calculated by measuring the phase shift from firing to firing at a specific range gate. Instead of measuring the Doppler spectrum at one range gate in the image, mean blood velocity from multiple vector positions and multiple range gates along each vector are calculated, and a two-dimensional image is made from this information.

The color flow midprocessor 12 (FIG. 1) receives the summed left and right, complex I/Q data from the beamformer 2 and processes it to calculate flow velocity, turbulence, and power for all sample volumes within an operator-defined region. The incoming data is rate converted and down-sampled such that the resulting number of data points is consistent with the output display resolution. The down-sampling is done by point accumulation, and the combination of rate conversion and down sampling is such that the number of points in the range vector is equal to or greater than the number of display points, but fits into the available memory of the acoustic frame buffer in the scan converter. The downsampled data is stored in a corner turner (not shown), whose purpose is to buffer data from possibly interleaved firings and output the data as vectors of points across firings at a given range cell.

The mean blood velocity, variance (representing blood turbulence) and total prenormalization power are calculated. The prenormalization power is possibly used as a threshold for the resulting velocity and turbulence estimates. These three output values are then combined into two final outputs, one primary and one secondary. The primary output will be eight bits and either VELOCITY or POWER will be selected. The secondary output will be four bits and can be either VARIANCE or POWER. Which two values will be displayed is determined by the operator-selected display mode. Both values are sent to the scan converter, where they will be scan converted separately.

The scan converter/display controller 6 accepts processed digital data from the midprocessors. The scan converter performs the coordinate transformation of the color flow (16) and B mode (18) data from polar coordinate (R-θ) sector format or Cartesian coordinate linear array to appropriately scaled Cartesian coordinate display pixel data stored in X-Y display memory 22. The M mode and Doppler data types are interpolated in both dimensions (range and time for M or frequency and time for Doppler) in display memory 20. The video processor 24 displays the resulting image in a raster scan format on video monitor 8.

For B mode images, the B mode acoustic line memory (ALM) 18 acquires and stores the left and right data in a polar or Cartesian vector format from the B/M midprocessor 14. The coordinate transform function generates addresses used to map the information into a pixel value at a given X-Y coordinate for display. The mapping function utilizes a two-dimensional interpolation.

For color flow images, the color ALM 98 performs the same function as the B mode ALM. Each data stream (left and right) consists of up to two values per spatial data point: 8-bit velocity only, 8-bit velocity and 4-bit turbulence, 8-bit velocity and 4-bit power, or 8-bit power only. If two values are present, they are scan converted separately. The resulting scan-converted X-Y frame is then operated on as a single image.

The coordinate transform generates the R and θ or Cartesian to Cartesian addresses and error (interpolation factors) for the B mode ALM 18 and color ALM 20 to use in mapping from polar coordinate vector or Cartesian coordinate linear array data to X-Y data. Additional image processing may be performed after scan conversion.

The video processor 24 multiplexes between the graphics/physio data, image data, and reference bar data to generate the final video output. Additionally it provides for various greyscale and color maps as well as combining the greyscale and color images.

Figure 4:
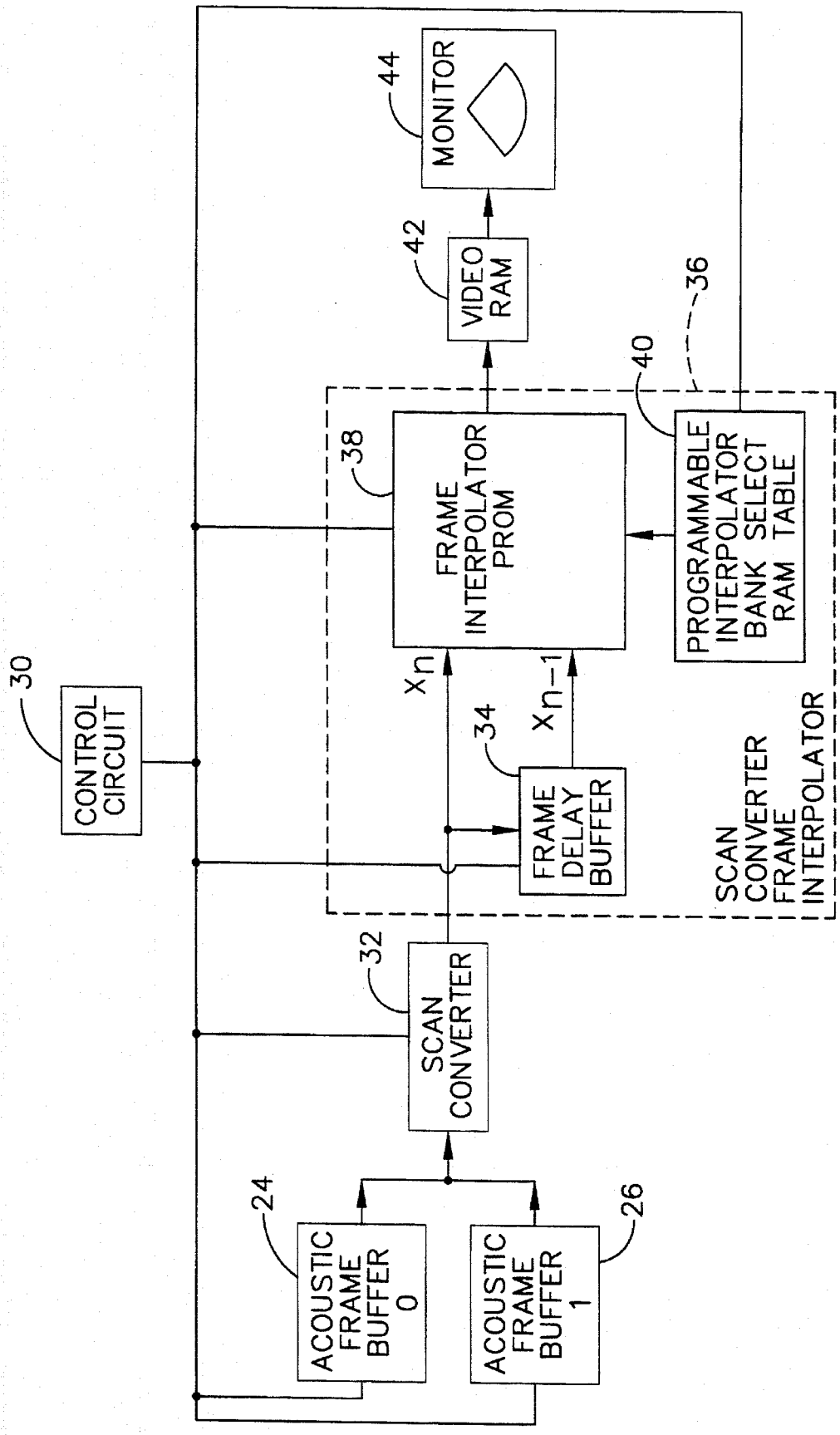
FIG. 4 is a block diagram showing the hardware for performing acoustic frame interpolation in accordance with the preferred embodiment of the invention.

In accordance with the invention, the conventional scan converter and display controller is improved by incorporating double-buffered acoustic frame buffers 24 and 26 in one or both of the acoustic line memories 16 and 18 and by incorporating a frame interpolator 36 between the scan converter 32 and a video RAM 42, as shown in FIG. 4. The use of two acoustic frame buffers eliminates the swirl artifact in the displayed image. The frame interpolator provides an increase in the apparent acoustic frame rate.

In accordance with the preferred embodiment of the invention, the acoustic frame buffers 26 and 28 alternatingly receive acoustic data from the color flow or B mode processor under the control of a conventional read/write control means 30. Control means 30 enables the read mode in only one of acoustic frame buffers 26 and 28 during any given cycle. The outputs of acoustic frame buffers 26 and 28 are alternatingly transmitted to the input of a scan converter 32 under the control of control means 30. [The singular nouns "input" and "output" as used herein refer to multiple-pin sets arranged in parallel to carry a multiple-bit word, e.g., 8-bit velocity values.] The output of scan converter 32 is alternatingly transmitted either to a first input of a frame interpolator PROM 38 or to the input of a frame delay buffer 34 under the control of control means 30. It will be readily understood by persons skilled in the art of circuit design that circuits 26, 28, 32, 34 and 38 may be in the form of integrated chips having read and write terminals incorporated therein and connected to the control circuit.

The frame interpolator PROM 38 has a first input connected to the output of scan converter 32 and a second input connected to the output of frame delay buffer 34. The pipelined pixel data carried on the first and second inputs to PROM 38 form successive 16-bit addresses of PROM 38 from which stored interpolation data is retrieved for constructing an interpolated frame, as described in detail below.

The acoustic data corresponding to successive pixels of first and second frames are pipelined from the double-buffered acoustic frame buffers 26 and 28 into the frame interpolator PROM 38 as follows. After a first complete acoustic frame has been written into acoustic frame buffer 26 in a first cycle, the next acoustic frame is written into acoustic frame buffer 28 during a second cycle. During the second cycle, while the second acoustic frame is being written into acoustic frame buffer 28, the first acoustic frame is read from acoustic frame buffer 26 and input into the scan converter. The scan-converted acoustic data $X_{n-1}$ of the first acoustic frame is stored in frame delay buffer 34.

During the next and third cycle, the first acoustic frame stored in acoustic frame buffer 26 is overwritten by the acoustic data of a third acoustic frame and the second acoustic frame is read from acoustic frame buffer 28 and input into the scan converter. The scan-converted acoustic data $X_n$ of the second acoustic frame is input to the first input of frame interpolator PROM 38. At the same time, the scan-converted acoustic data $X_{n-1}$ of the first acoustic frame stored in the frame delay buffer 34 is input to the second input of frame interpolator PROM 38.

The frame interpolator PROM 38 incorporates a two-point FIR filter which outputs a frame of interpolated scan-converted acoustic data $X_n'$ in response to input of scan-converted acoustic data $X_n$ and $X_{n-1}$. The interpolated scan-converted acoustic data $X_n'$ are generated using the following formula:

$$X_n' = (weight1 \cdot X_n) + (weight2 \cdot X_{n-1})$$

where weight1 and weight2 are respective weighting factors having a sum equal to unity.

If the 8-bit acoustic data is velocity, care must be taken to not interpolate across aliasing limits (i.e., −128 and +127). If the difference between neighboring velocity points is large, aliasing has probably occurred, and one does not want to frame interpolate between these points. Therefore, the addition in the foregoing interpolation formula should include compensation for aliasing.

In accordance with the preferred embodiment of the invention, the frame interpolator PROM 38 has eight selectable banks of interpolated data $X_n'$ computed in accordance with the foregoing formula. The banks of frame interpolator PROM 38 are selectable via a soft-ware-programmable interpolator bank select look-up table 40. Each location in the interpolator bank select look-up table is programmed with a bank select value. The interpolator bank select look-up table is sequenced through at the video rate, allowing the frame interpolator PROM bank to be specified for each successive scan conversion. Up to four of the available eight PROM banks can be selected in a given interpolator bank select look-up table sequence. This allows up to four frames of unique scan-converted acoustic data $X_n'$ to be generated from the acoustic data $X_n$ and $X_{n-1}$ of a given pair of frames. The successively generated acoustic data frames are stored in the video RAM 42 and then displayed in a raster scan format on a video monitor 44.

In accordance with the preferred embodiment of the invention, of the four frames produced from each pair of frames comprised of acoustic data $X_{n-1}$ and $X_n$, one frame is the first acoustic frame having acoustic data $X_{n-1}$ and the other three frames are interpolated frames generated by interpolating the first and second acoustic frames having acoustic data $X_{n-1}$ and $X_n$. For example, by selecting a bank in which weight1=0 and weight2=1.0, the acoustic data $X_{n-1}$ of the first acoustic frame can be passed through PROM 38 unchanged. Then three other banks can be selected in succession having weight1 and weight2 which are both non-zero and which are different for each selection. For each bank selection, the first acoustic frame stored in the frame delay buffer 34 is input to the first eight address pins of PROM 38 and the second acoustic frame stored in the second acoustic frame buffer 28 is scan-converted and then input to the second eight address pins of PROM 38, each time producing a unique interpolated frame. In this way, four frames can be generated from the first and second acoustic frames, including the first acoustic frame and three unique interpolated frames derived from the first and second acoustic frames.

In accordance with the invention, while the foregoing sequence is being carried out, a third acoustic frame having acoustic data $X_{n+1}$ is written into acoustic frame buffer 26. Upon completion of the foregoing sequence, the acoustic frame having acoustic data $X_n$ is transferred from acoustic frame buffer 28 to frame delay buffer 34. Thereafter, the third acoustic frame having acoustic data $X_{n+1}$ is read out of acoustic frame buffer 26 and the second acoustic frame having acoustic data $X_n$ is read out of frame delay buffer 34 and then the acoustic data of the second and third acoustic frames are simultaneously and repeatedly (i.e., four times) used to address PROM 38 during the given interpolator bank select look-up table sequence described above. In this way, four frames can be generated from the second ad third acoustic frames, including the second acoustic frame and three unique interpolated frames derived from the second and third acoustic frames.

The foregoing steps are repeated for the third and fourth acoustic frames, for the fourth and fifth acoustic frames and so forth. Using this technique, the effective acoustic frame rate can be increased by a factor of four.

Thus, the frame interpolation of the invention allows at least a fourfold improvement in the apparent acoustic frame rate and eliminates the swirl artifact. The result is the presentation of a smoother and less distracting image to the ultrasound machine operator. This technique can be applied to B-mode imaging as well as to color flow imaging.

The foregoing preferred embodiment has been disclosed for the purpose of illustration. Variations and modifications will be readily apparent to those skilled in the art of ultrasonic imaging systems. For example, it should be apparent that the number of banks in the frame interpolator PROM and the number of selectable banks in a given interpolator bank select sequence is not limited to four, but rather can be increased to provide an even greater interpolation factor. All such variations and modifications are intended to be encompassed by the claims set forth hereinafter.

We claim:

1. A circuit for processing frames of acoustic image data for display on a video monitor, comprising:

first and second acoustic frame buffers each having a storage capacity sufficient to store a complete acoustic frame of acoustic image data;

means for scan converting acoustic image data received from either of said first and second acoustic frame buffers; and control means for controlling the input and output of acoustic image data into and out of said first and second acoustic frame buffers and the output of scan-converted acoustic image data from said scan converting means, wherein said control means control the input of a first acoustic frame into said first acoustic frame buffer during a first cycle, the input of a second acoustic frame into said second acoustic frame buffer during a second cycle after said first cycle and the output of said first acoustic frame from said first acoustic frame buffer to said scan converting means during said second cycle.

2. The circuit as defined in claim 1, wherein said control means control the input of a third acoustic frame into said first acoustic frame buffer during a third cycle after said second cycle, and the output of said second acoustic frame from said second acoustic frame buffer to said scan converting means during said third cycle.

3. The circuit as defined in claim 2, further comprising a frame delay buffer connected to the output of said scan converting means, wherein said control means control the input into said frame delay buffer of a scan-converted version of said first acoustic frame during said second cycle and the output from said frame delay buffer of said scan-converted version of said first acoustic frame during said third cycle.

4. The circuit as defined in claim 3, further comprising means for generating an interpolated acoustic frame having acoustic image data each of which is the sum of a weighted version of a respective acoustic image datum of said scan-converted version of said first acoustic frame and a weighted version of a respective acoustic image datum of said scan-converted version of said second acoustic frame in response to the output of said scan-converted version of said first acoustic frame by said frame delay buffer and the output of said scan-converted version of said second acoustic frame by said scan converting means during said third cycle.

5. The circuit as defined in claim 4, wherein said means for generating an interpolated acoustic frame comprises a programmable read only memory having a first set of input terminals connected to said frame delay buffer and a second set of input terminals connected to said scan converting means.

6. The circuit as defined in claim 5, wherein said programmable read only memory has a plurality of selectable banks, each of said banks containing values which are a function of a unique pair of weighting factors and the respective address at which the value is stored in said programmable read only memory, further comprising means for selecting any one of said plurality of selectable banks, the acoustic image data of said interpolated acoustic frame consisting of values retrieved from the selected bank using addresses formed by combining scan-converted acoustic image data of said first acoustic frame with scan-converted acoustic image data of said second acoustic frame.

7. The circuit as defined in claim 4, wherein each of said acoustic image data of said interpolated acoustic frame is generated in accordance with the following formula:

$$X_n' = (weight1 \cdot X_n) + (weight2 \cdot X_{n-1})$$

wherein weight1 is a first weighting factor and weight2 is a second weighting factor, the sum of weight1 and weight2 being equal to unity.

8. A circuit for processing frames of acoustic image data for display on a video monitor having a video rate, comprising:

means for inputting a succession of acoustic frames during successive cycles;

means for scan converting each of said acoustic frames from said inputting means in succession;

means for storing a scan-converted acoustic frame until the next acoustic frame has been scan converted; and means for generating an interpolated acoustic frame which is an interpolation of the stored scan-converted acoustic frame and the next scan-converted acoustic frame, wherein said interpolated acoustic frame is determined in accordance with a predetermined weighting function.

9. The circuit as defined in claim 8, further comprising:

means for storing a plurality of banks of interpolated acoustic frames, each bank containing a multiplicity of interpolated acoustic frames corresponding to all possible pairs of scan-converted acoustic frames, the interpolated acoustic frames within each bank being generated as a function of a respective unique set of weighting factors; and means for selecting any one of said banks of interpolated acoustic frames in accordance with a desired interpolation.

10. The circuit as defined in claim 9, wherein said selecting means comprises means for selecting a sequence of banks at said video rate.

11. The circuit as defined in claim 8, wherein said storing means comprises a frame delay buffer connected to the output of said scan converting means.

12. The circuit as defined in claim 11, wherein said means for generating an interpolated acoustic frame comprises a programmable read only memory having a first set of input terminals connected to said frame delay buffer and a second set of input terminals connected to said scan converting means.

13. The circuit as defined in claim 12, wherein said programmable read only memory has a plurality of selectable banks, each of said banks containing values which are a function of a unique pair of weighting factors and the respective address at which the value is stored in said programmable read only memory, the acoustic image data of said interpolated acoustic frame consisting of values retrieved from the selected bank using addresses formed by combining acoustic image data of said stored scan-converted acoustic frame with acoustic image data of said next scan-converted acoustic frame.

14. The circuit as defined in claim 8, wherein said interpolated acoustic frame consists of acoustic image data, each of which is the sum of a weighted version of a respective acoustic image datum of said stored scan-converted acoustic frame and a weighted version of a respective acoustic image datum of said next scan-converted acoustic frame.

15. The circuit as defined in claim 8, wherein said interpolated acoustic frame consists of acoustic image data, each of which is generated in accordance with the following formula:

$$X_n'=(\text{weight1}\cdot X_n)+(\text{weight2}\cdot X_{n-1})$$

wherein weight1 is a first weighting factor and weight2 is a second weighting factor, the sum of weight1 and weight2 being equal to unity.

16. A method for processing frames of acoustic image data for display on a video monitor having a video rate, comprising the steps of:

scan converting a first acoustic frame to generate a first scan-converted acoustic frame;

storing said first scan-converted acoustic frame until said second acoustic frame has been scan converted;

scan converting a second acoustic frame to generate a second scan-converted acoustic frame;

retrieving said first scan-converted acoustic frame from storage; and generating a first interpolated acoustic frame which is an interpolation of said first and second scan-converted acoustic frames, wherein said first interpolated acoustic frame is determined in accordance with a first predetermined weighting function.

17. The method as defined in claim 16, further comprising the steps of:

after said first interpolated acoustic frame has been generated, scan converting said second acoustic frame a second time to regenerate said second scan-converted acoustic frame;

retrieving said first scan-converted acoustic frame from storage a second time; and generating a second interpolated acoustic frame which is an interpolation of said first and second scan-converted acoustic frames, wherein said second interpolated acoustic frame is determined in accordance with a second predetermined weighting function having weighting factors which are different than the weighting factors of said first predetermined weighting function.

18. The method as defined in claim 17, further comprising the step of selecting said first and second predetermined weighting functions in sequence at said video rate from a plurality of predetermined weighting functions.

19. The method as defined in claim 18, wherein each of said first and second predetermined weighting functions has the form:

$$X_n'=(\text{weight1}\cdot X_n)+(\text{weight2}\cdot X_{n-1})$$

wherein weight1 is a first weighting factor and weight2 is a second weighting factor, the sum of weight1 and weight2 equals unity, and weight1 and weight2 for said first predetermined weighting function are different than weight1 and weight2 for said second predetermined weighting function.

20. The method as defined in claim 16, wherein said first and second acoustic frames are stored in first and second buffers respectively, said first and second buffers being read independently.

* * * * *